US009979548B2

(12) United States Patent
Cesnik et al.

(10) Patent No.: US 9,979,548 B2
(45) Date of Patent: *May 22, 2018

(54) ENERGY HARVESTING CRYPTOSYSTEM

(71) Applicant: Clutch Authentication Systems, LLC, Winchester, VA (US)

(72) Inventors: Jeffrey Cesnik, Winchester, VA (US); David Atherton, Leesburg, VA (US)

(73) Assignee: Clutch Authentication Systems, LLC, Winchester, VA (US)

( * ) Notice: Subject to any disclaimer, the term of this patent is extended or adjusted under 35 U.S.C. 154(b) by 189 days.

This patent is subject to a terminal disclaimer.

(21) Appl. No.: 15/157,210

(22) Filed: May 17, 2016

(65) Prior Publication Data

US 2017/0338960 A1 Nov. 23, 2017

(51) Int. Cl.
*H04L 9/32* (2006.01)
*H04L 12/10* (2006.01)
*G06F 1/26* (2006.01)
*G06F 1/32* (2006.01)
*G06F 21/44* (2013.01)
*H04L 12/12* (2006.01)
*H04M 1/725* (2006.01)
*H04L 29/06* (2006.01)

(52) U.S. Cl.
CPC ............ *H04L 9/3234* (2013.01); *G06F 1/266* (2013.01); *G06F 1/3206* (2013.01); *H04L 9/3271* (2013.01); *H04L 12/10* (2013.01); *G06F 21/44* (2013.01); *G06F 2212/178* (2013.01); *H04L 12/12* (2013.01); *H04L 63/0853* (2013.01); *H04M 1/72527* (2013.01)

(58) Field of Classification Search
CPC ... H04L 9/3234; H04L 63/0853; H04L 12/10; H04L 12/12; G06F 1/266; G06F 21/44; G06F 2212/178; H04M 1/72527
See application file for complete search history.

(56) References Cited

U.S. PATENT DOCUMENTS

| 9,489,672 | B1 * | 11/2016 | Poole | G06Q 20/3226 |
| 9,692,751 | B1 * | 6/2017 | Frohman | H04L 63/0838 |
| 2006/0234771 | A1 * | 10/2006 | Shavrov | H01R 31/06 455/557 |
| 2012/0305645 | A1 * | 12/2012 | Morley, Jr. | G06K 7/083 235/380 |

OTHER PUBLICATIONS

Chengyang Yao, et al. "Efficient Power Harvesting from the Mobile Phone Audio Jack for mHealth Peripherals", IEEE 2015 Global Humanitarian Technology Conference, 2015.*
Sheng KY, Sonal V, Thomas S, Prabal D. Hijacking Power and Bandwidth from the Mobile Phone's Audio Interface. London: ACM DEV '10; Dec. 17-18, 2010.

* cited by examiner

Primary Examiner — Jayesh Jhaveri
(74) Attorney, Agent, or Firm — Da Vinci's Notebook, LLC

(57) ABSTRACT

A system and method of low-power cryptography is disclosed involving a computing device with an audio jack that communicates with a token plugged into the audio jack. Data is passed between the computing device and token over audio channels; power for all functions necessary for the token to operate as disclosed is also supplied by the computing device to the token over an audio channel. The token may be used as an identity and authentication security factor, for secure external key exchange, or direct encryption of small payloads.

24 Claims, 12 Drawing Sheets

ENERGY HARVESTING CRYPTOSYSTEM

FIELD OF THE INVENTION

The present invention relates to the field of cryptography and more specifically to the field of portable authentication devices and processes.

BACKGROUND

Dramatic growth in mobile, BYOD (bring your own device) and disruptive technologies such as IoT (internet of things) are placing increased demands on cyber security. In response, technologies for mobile identity and authentication are gaining traction. A noteworthy market indicator is the new FIDO Alliance (Fast IDentity Online) and its U2F (Universal Second Factor) and UAF (Universal Authentication Framework) standards for identity and authentication.

Current hardware-based identity and authentication solutions provide virtually no support for mobile device platforms. USB solutions, while mature for consumers and enterprises using desktops and laptops, are not generally applicable to mobile devices. NFC and Bluetooth hardware are not universally supported within the mobile ecosystem and present new threat vectors. Current mobile implementations generally rely on software-only or hybrid solutions that incorporate on-device biometric sensors and/or on-device "secure enclaves", but may be susceptible to complex threat vectors and generally require provisioning on a per-user/per-device basis. A removable hardware solution that can be used across mobile devices and platforms with a common user experience is desirable for strong identity and authentication use cases.

There are numerous ways to connect an external hardware device to a smart mobile device. There are USB connectors (or more specifically, mini- or micro-USB), vendor-specific connectors (such as the proprietary and royalty-encumbered Apple Lightning connector), and numerous RF-based channels—Bluetooth, Bluetooth LE (low energy), Wi-Fi, and more recently NFC (near field communications). Unfortunately, interface standardization and specification adherence in the marketplace across device platforms is lacking. Some models of mobile device allow you to draw power from their USB connector, some do not. Some mobile devices may implement Bluetooth or NFC, while others may not implement any wireless communications standards. This makes it very difficult to manufacture one device that will consistently work across multiple product lines from multiple vendors.

One interface, often overlooked and common to just about all mobile device platforms (and certainly most consumer-oriented computing platforms), is the audio jack—designed for headphones and other audio devices. Low-power peripheral devices have begun to exploit the potential for waveforms sent from an audio jack to provide power and communications, such as various commercially-available external credit card reader devices; and a group of researchers from the University of Michigan investigated the general applicability of energy harvesting and digital communications from an audio port. See Sheng K Y, Sonal V, Thomas S, Prabal D. Hijacking Power and Bandwidth from the Mobile Phone's Audio Interface. London: ACM DEV '10; Dec. 17-18, 2010 (The disclosure of which is hereby incorporated by reference.). As energy available from an audio signal is relatively low, attempts to utilize an audio signal as a means for powering a cryptographic system and process have not traditionally been explored due to the technical challenges and the lack of sophisticated specifications given the novelty of the audio channel interface for such purposes.

SUMMARY

The present invention is directed to a system and method of low-power, energy-harvesting cryptography featuring a mobile computing device ("host") and a physical token ("token").

The host includes an audio jack, and the token includes a plug dimensioned to fit within that audio jack. A compatible host audio jack supports bidirectional audio over three distinct unidirectional channels (left, right, microphone) with a common ground reference. The token draws its only operating power from a host-supplied audio signal using an energy harvesting circuit within the token.

The host modulates and transmits an analog power waveform ("power waveform"), over a first audio channel ("power channel"). Once the token is powered, a communications protocol is established between the host and token. Digital data (a "request") is disassembled into a sequence of frames, modulated, and sent over a second audio channel ("request channel") as an analog data waveform ("request waveform") to the token. The token demodulates the sequence of frames from the request waveform, reassembles the request from that sequence, and performs an operation on that request and data derived from token memory to generate a response. The token then disassembles this response into a sequence of frames, modulates the resulting frame sequence into an analog waveform ("response waveform") and sends that response waveform over a third audio channel ("response channel"), to the host, which receives, demodulates, and reassembles the same.

The system and method as described could apply to any cryptographic request/response routine or operation, including for example random number bit stream generation (useful as an external entropy source), digital signature generation, digital signature verification, key derivation, Diffie-Helman key exchange (or any other cryptographic means of secure key exchange), encryption of an arbitrary payload based on a previously negotiated key exchange (or a provided encryption key), or any combination of these. The system described is useful for such things as identity and authentication, establishment of and encryption for secure messaging sessions, and establishment of and encryption for secure voice sessions.

In the case of identity and authentication, it is preferred that the host verifies the user's presence either through possession of the token directly (whereby the host enforces user verification by explicitly detecting insertion/removal of the token), or by providing to the token a user-generated and previously-registered passcode (or cryptographically salted and hashed version thereof) known only to the user and not stored on the host. During a single or multiple factor authentication challenge, for example, a WAN resource, e.g., a website, could supply a security challenge to the token via the host. The security challenge response could be generated as a digital signature calculated with a private key (or "token identity") known only to the token and either stored on the token directly or securely generated dynamically from external ancillary identification data (such as a key handle provided by the WAN resource), and supplied to the website from the token via the host.

It is an aspect of the present invention to provide a means of secure authentication that requires minimal power and can be universally applied to computing devices with audio jacks.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figure 1:
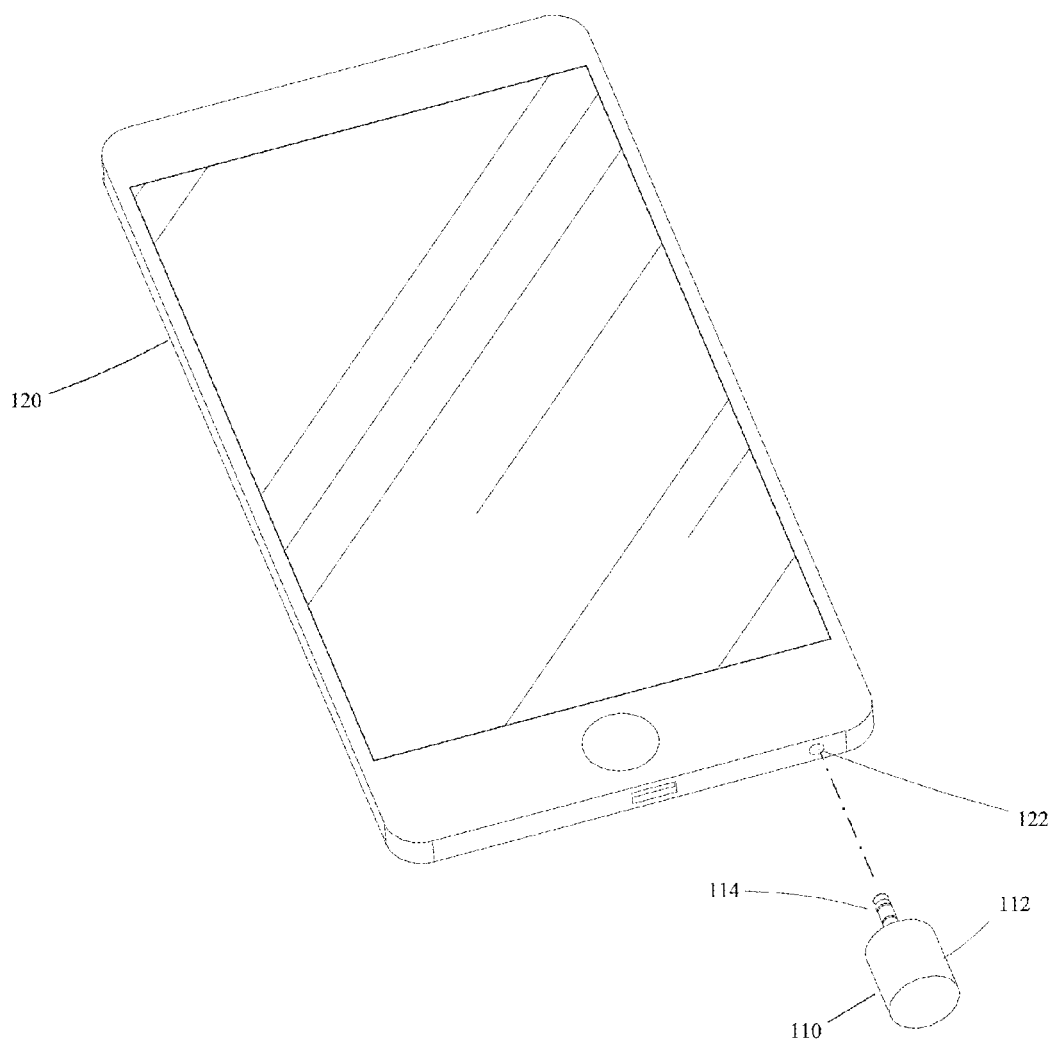
FIG. 1 is an isometric view of the system of the present invention.

Referring first to FIG. 1, a basic embodiment of the cryptographic system 100 is shown. A computing device ("host") 120 with an audio jack 122 interoperates with a physical token ("token") 110 having a body 112 and an audio plug 114 dimensioned to be inserted into the audio jack. The host can be any computing device with an audio jack that supports bidirectional audio communications via at least three distinct unidirectional channels: at least two outbound and at least one inbound, and a common ground reference, e.g., a typical stereo headset with microphone. The preferred hosts of the present invention include smartphones, e.g., APPLE IPHONE which utilizes an iOS operating system (OS), DROID which utilizes an ANDROID OS, and WINDOWS Phones which utilize a WINDOWS OS, as well as tablets and laptops, e.g., SAMSUNG GALAXY which utilizes an ANDROID OS, iPAD which utilizes an iOS OS, SURFACE which utilizes a WINDOWS OS, MACBOOK which utilizes a MacOS OS, and other laptops utilizing WINDOWS or LINUX OSes.

Figure 2:
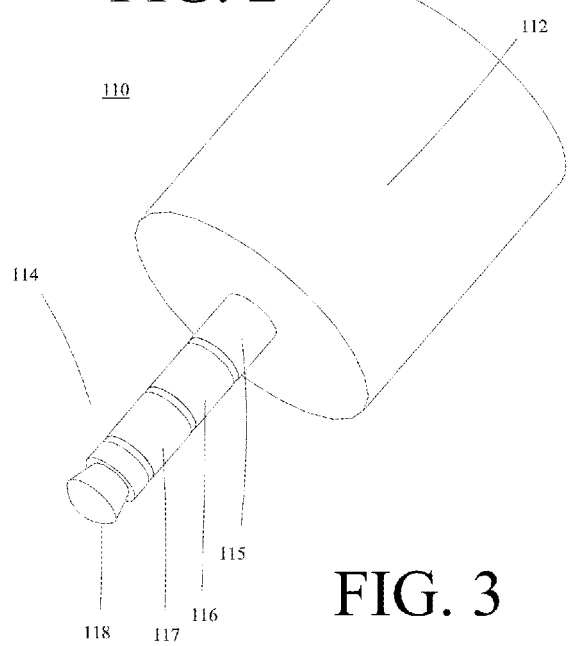
FIG. 2 is an isometric view of the token of the present invention.
Figure 3:
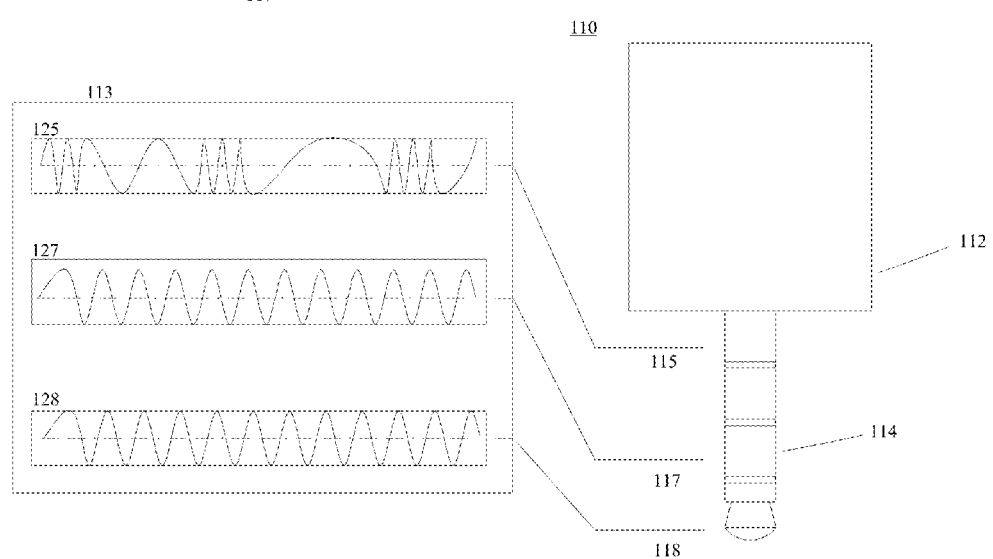
FIG. 3 is an isometric view of the token of the present invention, with reference to signaling generated thereby.

Turning to FIG. 2, corresponding to the jack present in the preferred hosts, this plug 114 offers connections for three channels: two channels, right 117 and left 118, for audio from the host to the token; and one channel, microphone 115, for audio from the token to the host, in addition to a common ground reference 116. The plug is a standard plug that conforms to applicable audio standards, including the American Headset Jack (AHJ) standard in effect as of the date of filing date of the present application, and the Open Mobile Terminal Platform (OMTP) standard in effect as of the date of filing of the present application. As such, the function of the connections for microphone 115 and ground 116 may be reversed depending on the standard to which the jack conforms.

Figure 10:
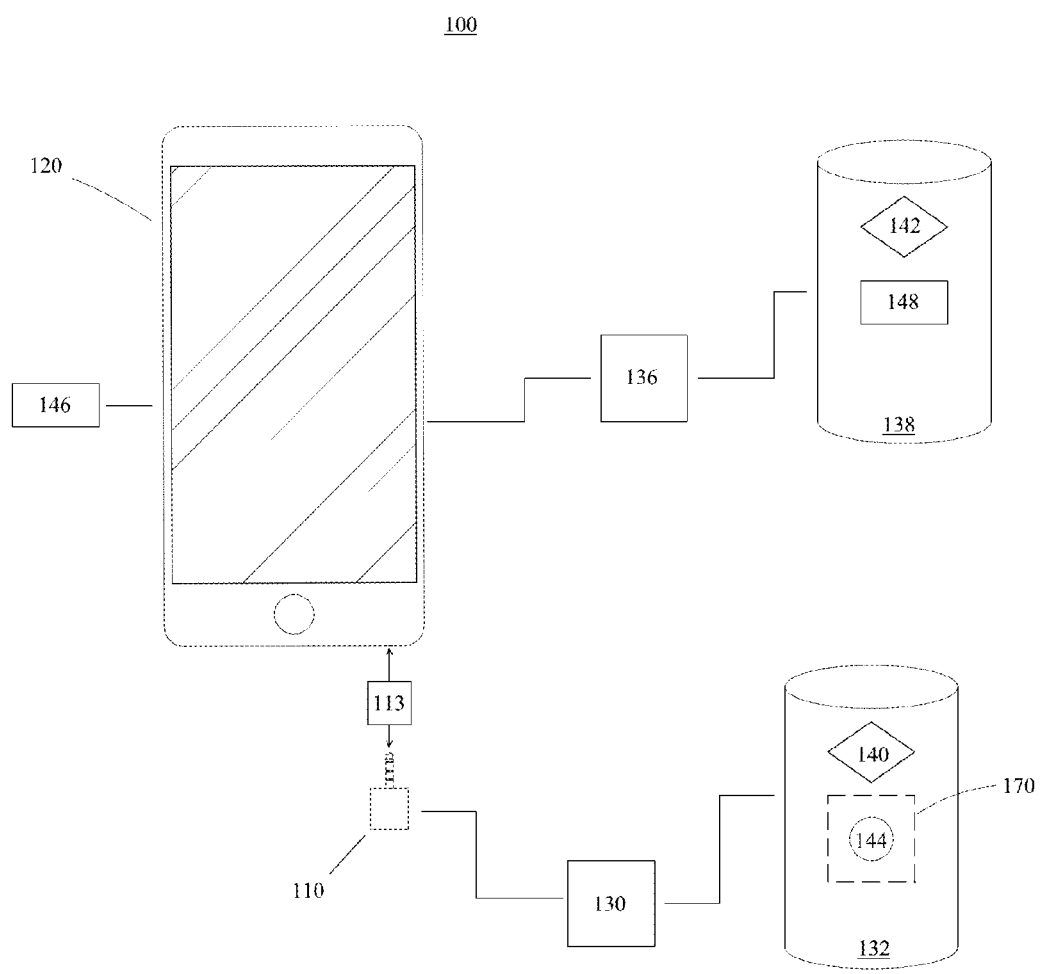
FIG. 10 is a view of the system of the present invention.
Figure 11:
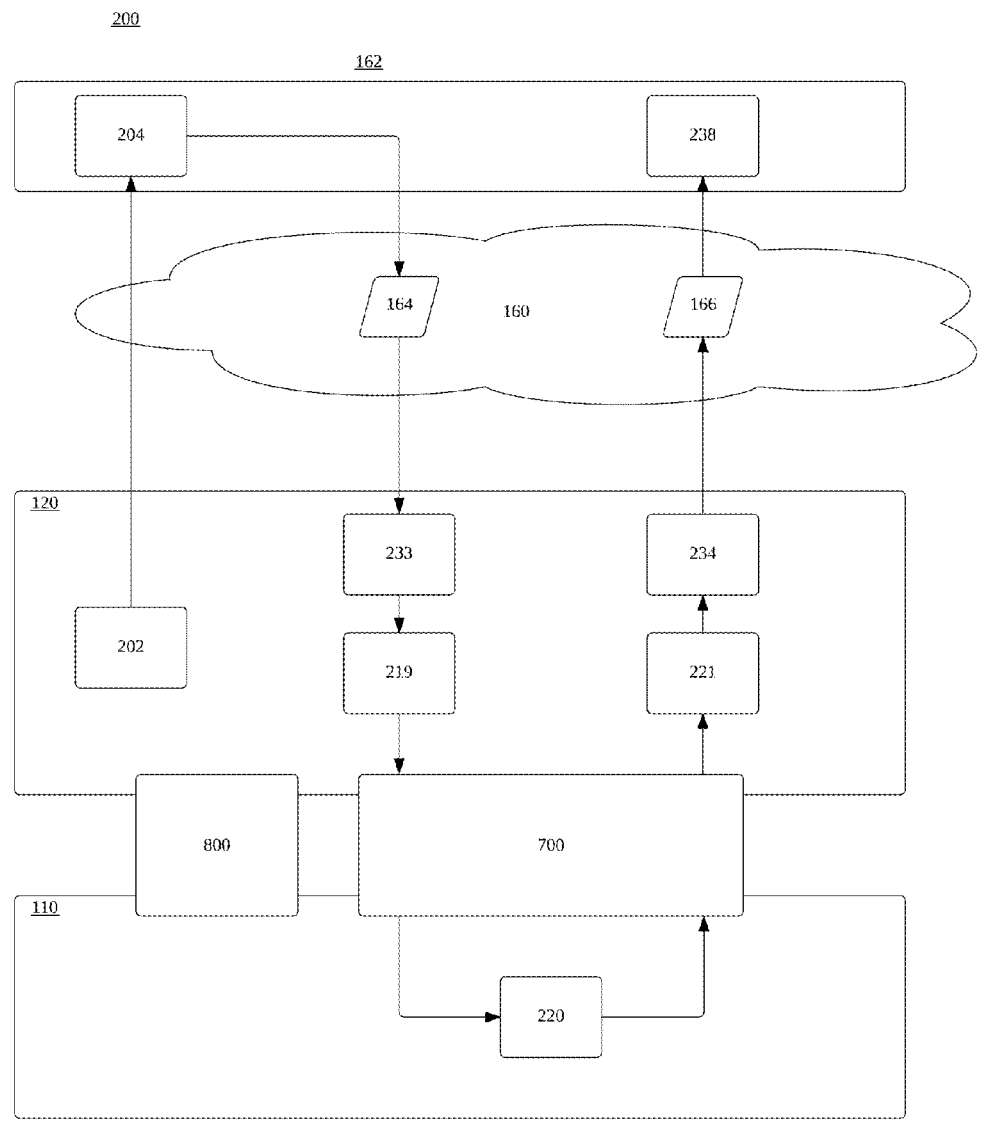
FIG. 11 is a view of the method of the present invention.

Turning now to FIGS. 1 and 10, the host 120 includes an arithmetic logic unit ("ALU") 136 and a nontransitory computer-readable storage medium in signaled communication with said host ALU ("host memory") 138. The token 110 of the present invention includes an ALU 130, and a nontransitory computer-readable storage medium in signaled communication with said token ALU ("token memory") 132. The token should enforce a strong guarantee of user identity and security. It is preferred that the token include a secure element 170 to store the token identity 144. By secure element, it is meant a tamper-resistant platform, typically a one chip secure memory and/or microcontroller element, capable of securely hosting applets and their confidential and cryptographic data (e.g., cryptographic keys, certificates) in accordance with guidelines and security requirements set forth by national and international standards bodies (e.g., NIST/FIPS standards, Common Criteria, EMVCo, and the Java Card platform standard).

When the audio plug 114 is inserted into the audio jack 122, the channels and ground reference of the audio jack connect with the applicable circuit rings 115, 116, 117, 118 of the plug 114 to create the circuits that allow communications over the channels 113. Once these circuits are created, the host and the token can begin their interoperation as a low-power cryptographic system.

Figure 4:
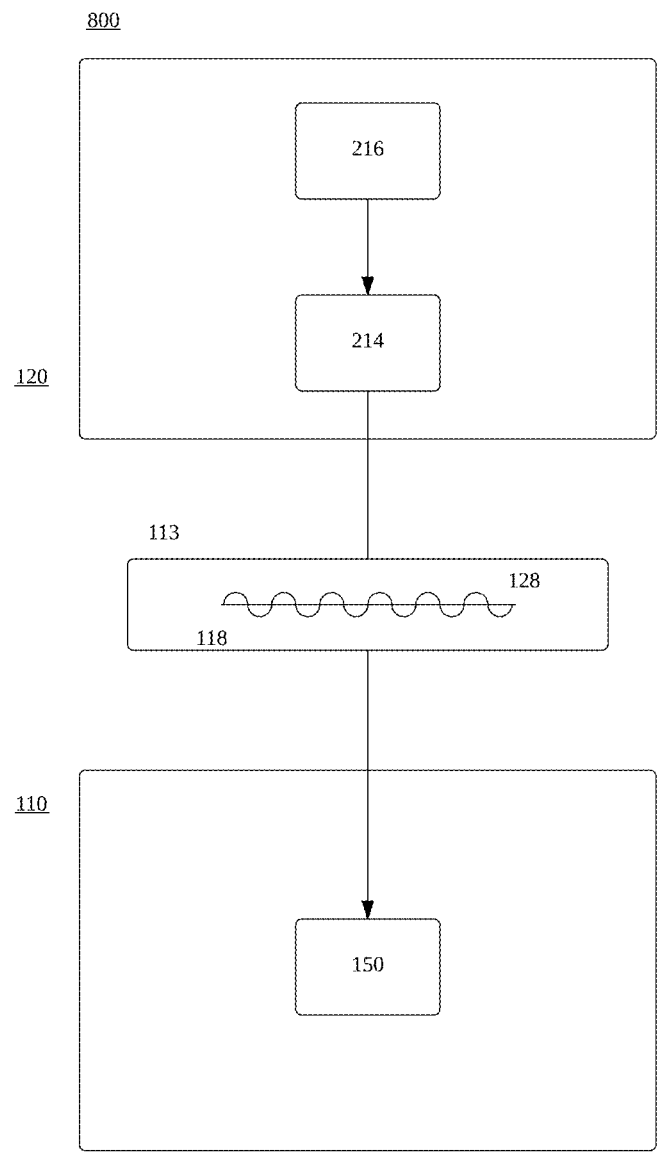
FIG. 4 is a detailed view of the power channel operation of the system of the present invention.
Figure 7:
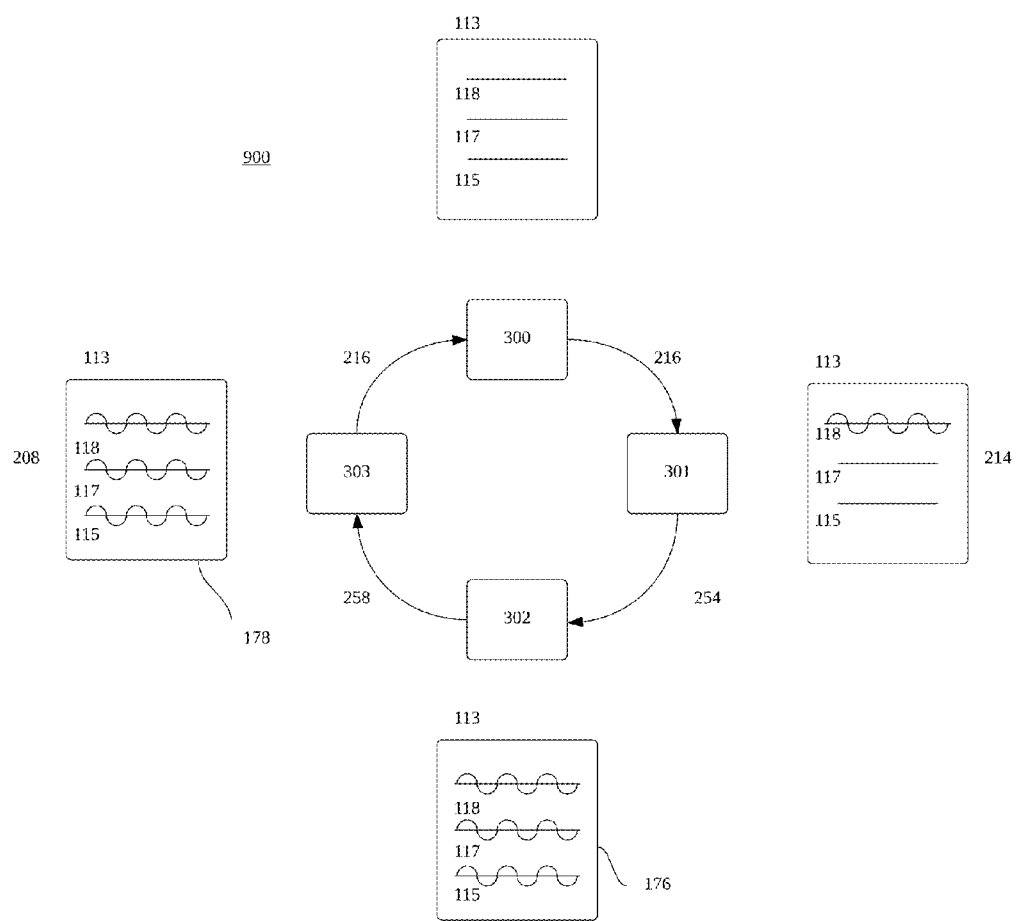
FIG. 7 is a view of the operational stages of the token of the present invention.

Referring now to FIGS. 4, 7, and 10, in stage zero of operation, the "passive stage" 300, the token is disconnected from the host. No waveforms are being transmitted from either the host 120 or the token 110 over the channels 113. The token 110 has no energy stored and is not performing any operations. Stage zero ends when the token is inserted into the host and this connection is detected 216.

In stage one of operation, the "power stage" 301, the token must be powered so it can perform the computational functions in later stages; the token has no power source but the host itself. During this stage, the host ALU and host memory bearing machine-readable instructions 142, or "host software", perform several functions 800. When the host software detects 216 that the token has been inserted, it creates a digital representation of an analog waveform that is subsequently modulated and transmitted 214 over an audio channel ("power channel") 118 as an analog audio waveform ("power waveform") 128, to be used by the token energy harvester 150.

Because the token is adapted to work with a broad range of smartphones and other devices, both popular and obscure, it is important to utilize an energy harvesting mechanism agnostic to the capabilities of any particular device. To achieve this compatibility, the energy harvesting circuit 150 is adapted to produce acceptable power even from hosts not able to produce strong audio amplitudes, which generally results in more energy being harvested than is necessary from the devices most prevalent in the marketplace.

Figure 5:
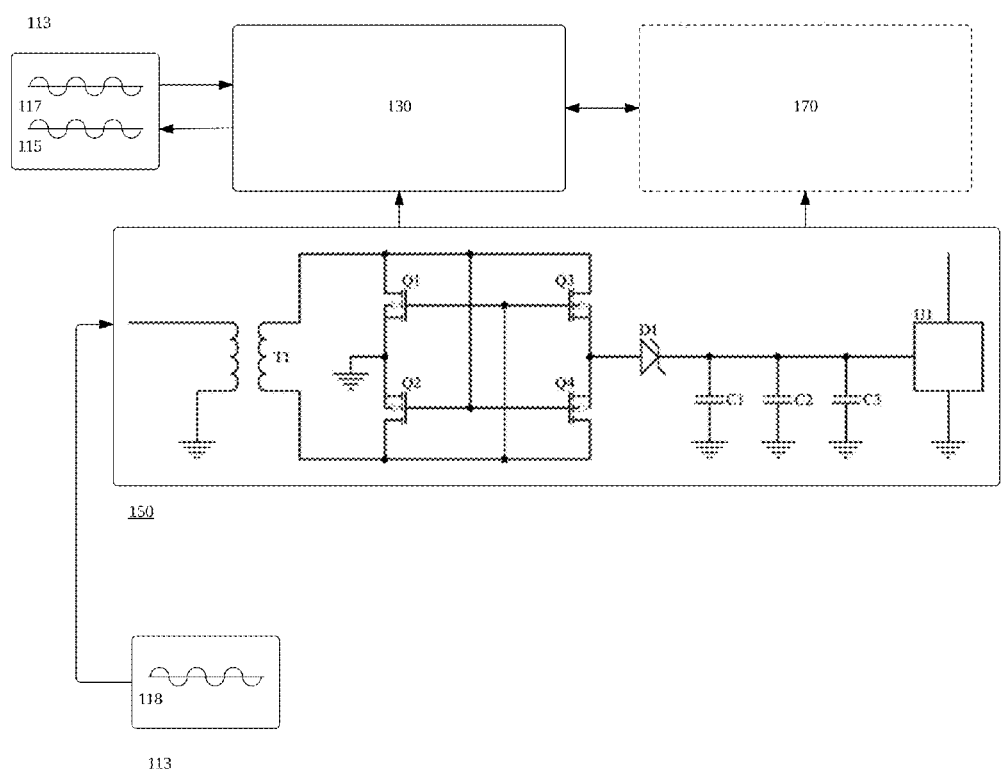
FIG. 5 is a view of the system level block diagram and the energy harvesting circuit of the present invention.
Figure 6:
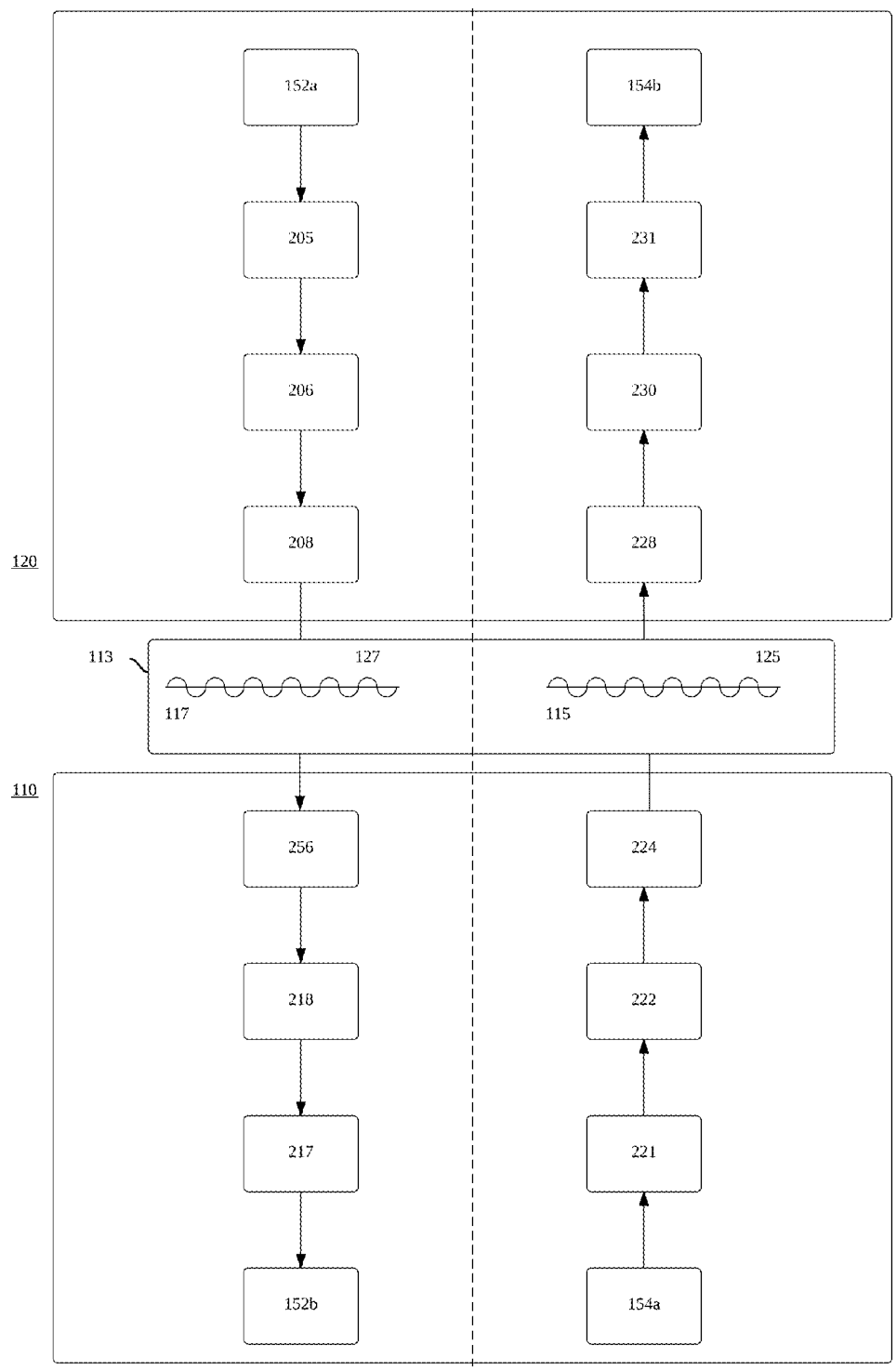
FIG. 6 is a detailed view of the operation of the data channels of the system of the present invention.

The amount of energy that can be harvested from a power waveform is related to the amplitude of the waveform, which for an audio channel is controlled by the volume level. Even at the highest volume levels, the audio waveforms of current mobile devices are insufficient to power a component performing intensive mathematical operations, such as cryptographic functions, without further conditioning. It is assumed that the preferred embodiment incorporates an energy harvesting circuit (and appropriate optimized component selections therein) able to harvest a sufficient amount of power within the operating envelope of both the host audio signal (being of low or high relative quality and amplitude) and the token. Modifications to the operational processes within the token to emphasize efficiency are handled in deeper stages of the process. Referring now to FIG. 5, the energy harvesting circuit begins with a transformer T1 that significantly amplifies the voltage (i.e., amplitude) of the power waveform. The amplified waveform is then passed through a synchronous rectifier bridge Q1 Q2 Q3 Q4, catch diode D1, and energy storage capacitors C1 C2 C3 that convert the alternating current of the amplified power waveform into the direct current required by the token ALU. A voltage regulator U1 regulates the harvester output voltage to the preferred token ALU operating voltage.

Referring now to FIGS. 7 and 10, in stage two of operation, the "protocol stage" 302, a data communication protocol is established 254 between the host and token by the host software 142 and token software 140. This protocol serves as the basis upon which stage three operation, wherein data is exchanged, can occur, and pertains to the manner in which data is organized when transmitted over an audio channel and is determined to be statistically or otherwise error-free by using, for example, a cyclic redundancy check (CRC) or forward error correction techniques. Data is subjected to any forms of encoding capable of ensuring its efficient transmission over analog channels, e.g., Manchester encoding.

Referring to FIGS. 7, 6, 10-12, during the protocol stage, both the host and the token perform additional functions 700. The host software disassembles 205 digital information, "requests" 152a, into frame sequences 178, modulates 206 those frame sequences into analog audio waveforms as request waveforms 127 and transmits 208 those waveforms over an available audio channel, the "request channel" 117, to the token. The host software also receives 228 response waveforms 125 over the available audio channel, the "response channel" 115, demodulates 230 them into frame sequences 178, and reassembles 231 the frame sequences into responses 154b. During this stage, the token software performs several functions. The token software receives 256 request waveforms 127 over the request channel 117, demodulates 218 them into frame sequences 178, and reassembles 217 those frame sequences into requests 152b (digitally equivalent to 152a). The token software also disassembles 221 responses 154a (digitally equivalent to 154b) into frame sequences 178, modulates 222 those frame sequences into analog audio waveforms ("response waveforms") 125 and transmits 224 to the host over the response channel 115. In the preferred embodiment, the token begins the establishment of the data communications protocol and the host follows. During the protocol stage requests 152a, 152b and responses 154a, 154b are empty, and the data exchanged consists entirely of frame boundaries 172, representing an idle state 176.

In stage three of operation, the "process stage" 303, data is exchanged 258 between the host and the token, pursuant to the communications protocol established in the protocol stage, to perform particular functions, e.g., authentication, secure chat, secure voice, or other cryptographic applications described herein. It should be noted that while in the preferred embodiment, stage zero 300 occurs after stage three 303 when the cryptographic operation e.g., authentication, is complete and the token is disconnected, stage zero may occur at any time a disconnection is detected 216.

It should also be noted that during the process stage, either the host or the token may initiate an exchange of data, i.e., the token may produce a response prior to a request from the host, that the nature and number of these requests and responses depends on the particular context, and that the phrases "requests" and "responses" do not imply a particular order of communication, but rather is styled to apply to information as transmitted in the preferred embodiment. This is similar to two-party phone calls, where either party may initiate the call, and there can be any number of requests and responses during the course of the call.

Furthermore, it should be noted that the use of the right or left audio channel for the power waveforms and the request waveforms is arbitrary; for purposes of the present invention the power waveform is transmitted over the left channel 118 and the request waveform is transmitted over the right channel 117. Typical audio jacks include only one microphone channel 115, leaving a single choice for the response channel.

The preferred power waveform 128 comprises a 15-16 kHz sinusoidal waveform, which has been experimentally determined to provide a good power level across a broad variety of hosts when used in conjunction with the tuned preferred energy harvesting circuit. While the combination of the experimentally determined preferred power waveform and tuned preferred energy harvesting circuit addresses the general challenge of broad device support, specific host configurations present specific challenges. A specific host may have partially malfunctioning audio channel or channels; it may have specific features activated that affect volume level (e.g., volume level locks, low-battery conservation mode) and the resulting harvested energy; or it may have peculiar electrical characteristics for other reasons, any of which could have a negative impact on the energy available to the token via the preferred power waveform.

In the preferred embodiment, the clock speed of the token ALU can be varied at the request of either host software or token software, in order to ascertain preferred token ALU clock speeds for that particular host/token combination. In the former case, the host can request clock speed adjustments via a request during the processing stage. In the latter case, the token can initiate a clock speed optimization on its own at any stage other than the passive stage. Given the generally-demanding processing requirements for cryptography, the fastest ALU clock speed is desirable; the direct tradeoff with clock speed and better performance is that higher clock speeds require higher power. The preferred embodiment offers the advantage of the best clock speeds available for the circumstances present.

Figure 8:
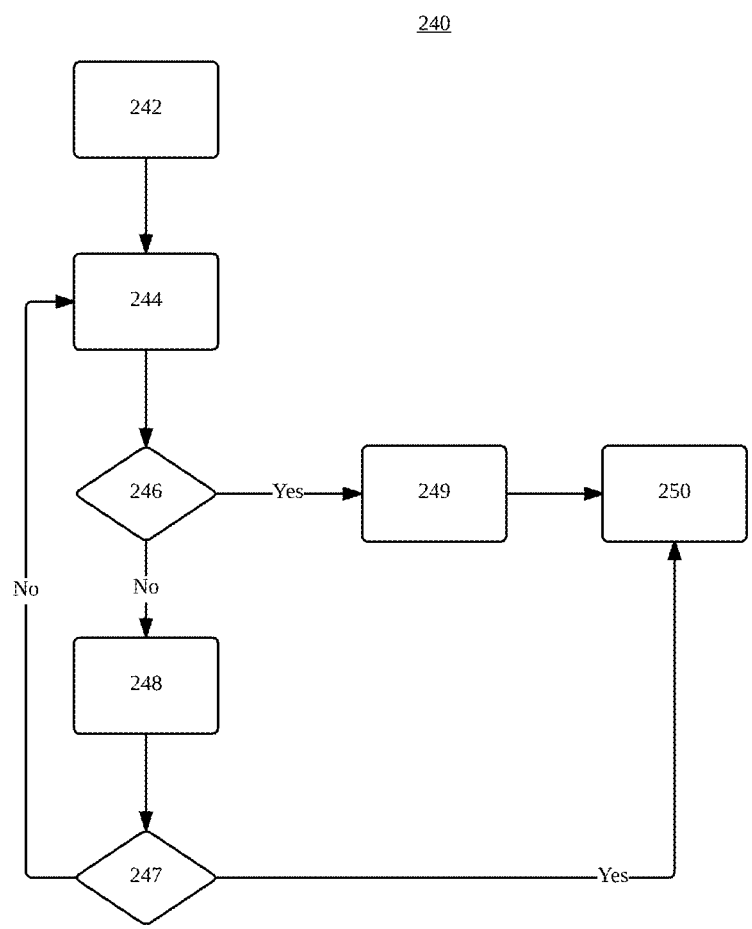
FIG. 8 is a detailed view of the clock speed scaling step of the present invention.

Turning to FIG. 8, the present invention utilizes machine-readable instructions to perform clock speed scaling 240. Clock speed scaling pursuant to the present invention permits an unknown host and the token to operate at an ideal clock speed given the power available. The token ALU begins processing at an artificially low clock speed 242, preferably provided as a predetermined default applicable to a broad range of mobile devices. Experimentally, a rate of 4 MHz has found to be ideal. The clock speed of the token ALU is allowed to vary 244 until one of two occurrences happens, (i) either the clock speed reaches its maximum 247, or (ii) the token ALU ceases to operate properly, or "browns out" 246, and restarts 249, presumably because the power channel and audio specifications of the device are inadequate for operating the present invention at the current clock speed. The metrics for the last known good clock speed are retained 248 in the token memory for later use 250 by the token 110.

A distinct preferred data communication rate ("bit rate") for each of the request and response channels addresses the general challenge of broad device support, but as with the power channel, specific configurations present specific challenges. The audio hardware for a model, manufacturing batch of that model, or specific serial numbered device of that model, may have electrical characteristics that are out of tolerance, whether due to defect, wear, or activated features, e.g., volume limit, battery saver. These deviations could make reliable data communications over the affected channels impracticable or impossible at the preferred bit rates.

In the preferred embodiment, the bit rate for data communications between the host and the token, for request and response channels independently, can be varied at the request of either host or token software, in order to ascertain preferred bit rates for that particular host/token/channel combination. As with clock speeds, there is a direct tradeoff: this time it is between speed and reliability—and to a much lesser extent, power consumption. The preferred embodiment offers the advantage of the best bit rates available for the circumstances present.

Figure 9:
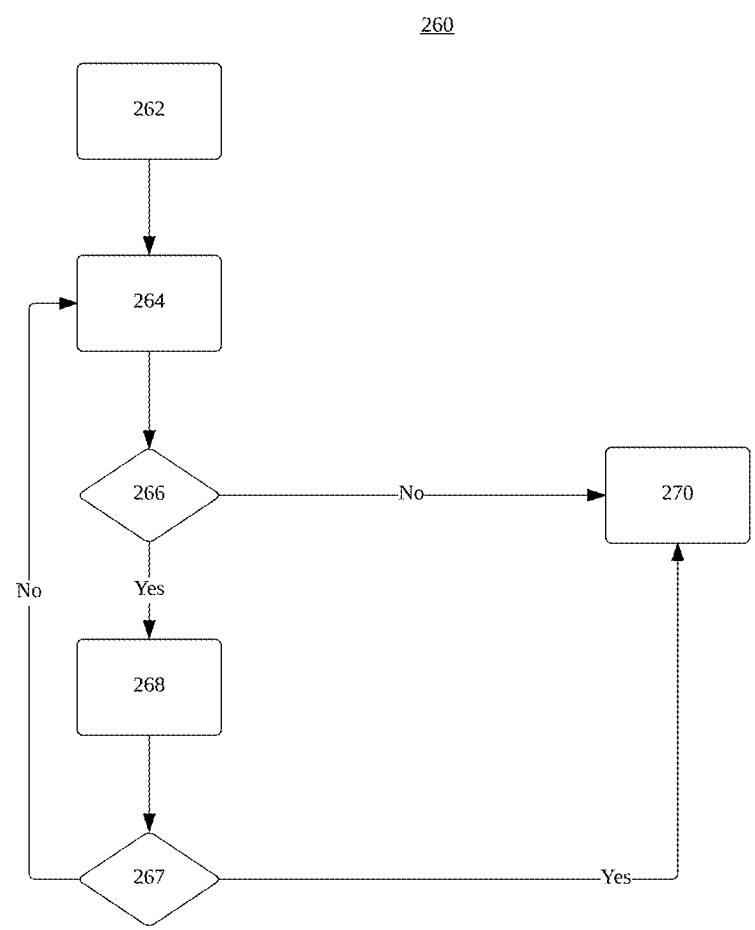
FIG. 9 is a detailed view of the bit rate scaling step of the present invention.

Turning to FIG. 9, the present invention utilizes machine-readable instructions to perform bit rate scaling 260. Bit rate scaling pursuant to the present invention permits an unknown host and token to exchange data at an ideal rate, for each of the request and response channels, given the available audio channels. For example, in the case of the token scaling the data communication bit rate for the response channel, the token ALU begins communications at an artificially low bit rate 262, preferably provided as a predetermined default applicable to a broad range of mobile devices. Experimentally, a signaling rate of approximately 4.4 kHz (corresponding to a data rate of approximately 4 kbps or 550 bytes/sec) has found to be ideal in terms of acceptable bit error rate (BER), for request and response channels. The bit rate of the response channel is allowed to vary 264 until one of two occurrences happens, (i) the bit rate reaches its maximum 267 related to the sampling rate used by the particular audio hardware being used (typically 44.1 kHz) and the Nyquist-Shannon sampling theorem, or (ii) the communications over that channel is no longer reliable 266, presumably because the audio channel is not capable of supporting the current data communications bit rate with an acceptable BER. The metrics for the last known good communications bit rate are retained 268 in the token memory for later use 270 by the token 110. In other examples, similar processes can be followed by the token software for the request channel and by the host software for the response channel by sending requests for bit rate scaling to the token over the request channel.

With respect to token ALU operations, and in addition to the preferred embodiment optimizations involving clock speeds and bit rates discussed above, there is an additional optimization offered in the preferred embodiment whereby during its use, either host software or token software can temporarily adjust ALU clock speeds or bit rates (for any channel) based on current operations. For example, if no cryptographic requests are pending, it may be beneficial to slow the token ALU clock speed. This is due to the fact that, in the preferred embodiment, while the token energy harvester captures energy from the host at an optimal rate, the token possesses a finite capacity to store that captured energy, so any reduction in energy consumption by the token when that energy is not needed preserves that energy for when it is needed, e.g., a cryptographic request is received. Without this optimization in the preferred embodiment, the token would not have the ability to temporarily increase its clock speed (and power consumption) above what the energy harvester could sustain based on the power waveform in a steady state. The preferred embodiment offers activity-based scaling of clock speeds 240 and bit rates 260 as another advantage over the basic embodiment.

Figure 12:
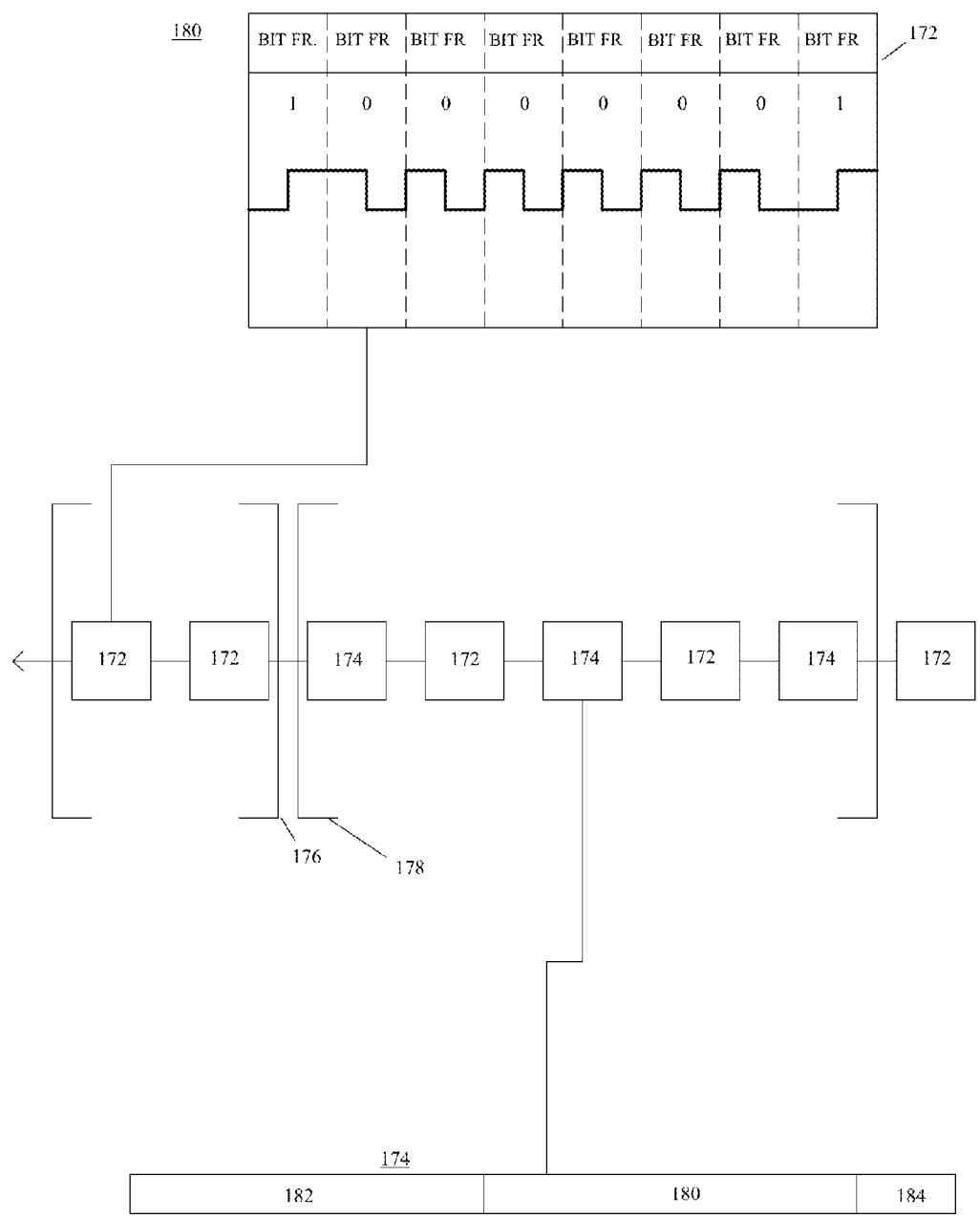
FIG. 12 is a view of the communications protocol of the present invention.

The present invention utilizes specialized data encoding techniques. As shown in FIG. 12, the communication protocol of the present invention utilizes a generic bit sequence that is applicable to several facets of the protocol. The generic bit sequence serves as a frame boundary 172. The frame boundary is composed of the bit sequence 10000001, although this sequence could be altered depending on circumstances. It is preferred that the token and host be in a continuous state of communication, i.e., both request and response channels active, even in the absence of data to be transmitted. This continuous state of communication serves to let the host know that the token is operating properly and is ready to communicate (and vice versa). Any interruption in the state of continuous communication lets the other party know that there is a potential problem (e.g., a failed clock scaling attempt, a failed bit rate scaling attempt, a token firmware problem, etc.). This continuous communication is an uninterrupted series of frame boundaries 172 that constitute an idle state 176 for the channel. This idle state 176 can occur over both the request and response channels.

When digital information, i.e., a request 152a or response 154a, is ready to be sent, representing an active state 178 for the channel, that information is disassembled into discrete frames 174 that will be transmitted between frame boundaries 172 until the final data frame is sent, at which time an idle state 176 occurs again. Data frames are of variable length based on the data to be transmitted and other factors. To the extent that the content of a data frame may be equivalent to a frame boundary, bit-stuffing techniques may be utilized to discern between data frames and frame boundaries. Each data frame 174 will include a portion of the original data 180 to be sent as well descriptive information, i.e., metadata, about the original data and other protocol information, e.g., frame number, CRC (an error detection method), start/end of frame flags, encryption state of the frame. This metadata may be placed in a combination of before 182 the data or after 184 the data within the frame.

As many websites and applications (or "relying parties") require strong authentication, the present invention may be useful to attest to users' identity and/or possession of the token. This may take the form of first factor authentication (1FA), whereby the enrolled users' credentials (username and private key corresponding to a previously registered public key) are stored on the token. During an authentication operation these credentials are (optionally but preferably) "unlocked" by sending a passcode, which is entered by the user on the host (but not stored on the host), to the token and then used to generate a cryptographic attestation based on the private/public keypair registered with the chosen credential which is provided back to the relying party. This may also take the form of second factor authentication (2FA), whereby the token does not store credentials but instead provides a cryptographic attestation of token possession (also optionally but preferably) "unlocked" by sending a passcode to the token through the same procedure described above. For either of these cases, and in the preferred embodiment, native token communication support is built into an application running on the host that is either the browser accessing the relying party (a "user agent") or a special token client application (an "authentication client"). An authentication client can be used by a third-party host application for authentication should native token communication support not be available to that application itself. In the case where the user agent is running on a desktop or other machine without direct token communication support, it is also possible to use a mobile device and an authentication client as a remote authenticator. In this case, the authentication client would accept and respond to authentication messages sent out of band with respect to the user agent communication with the relying party. Regardless of the implementation described above, the actual security process is the same as follows (referring again to FIGS. 6, 10 and 11):

1. Relying party 162 sends 204 a challenge 164 (e.g., a string of random numbers), ultimately intended for the token to cryptographically sign, either directly to a mobile user agent 148 (which may either communicate directly with the token if capable or indirectly via the authentication client), or to an authentication client 148 out of band. The host software receives 233 and prepares 219 the challenge for transmission to the token.
2. Optionally (but preferably), the user is prompted to enter a passcode 146 on the host which is sent to the token as a request 152a to "unlock" it with respect to the particular user.
3. The challenge is sent to the token as a request 152a, which cryptographically signs the challenge 220 (that is, creates a digital signature) with the private key 144, contained only on the token, corresponding to the public key previously registered with the relying party. The signed challenge 166 is returned as a response 154a from the token to the host, prepared 223, then sent 234 to the relying party. In the case of first factor authentication, the users' credentials (also previously registered with the relying party and contained only on the token) are also sent to the relying party.
4. The relying party cryptographically validates 238 the digital signature (based on the originally sent challenge) with the previously registered public key, and, in the case of first factor authentication, also receives the users' credentials.
5. The relying party makes a trust determination based on the result of the digital signature validation and provided user credentials (provided either by the user directly or provided by the token), and either allows or denies access to the relying party's application.

Figure 13:
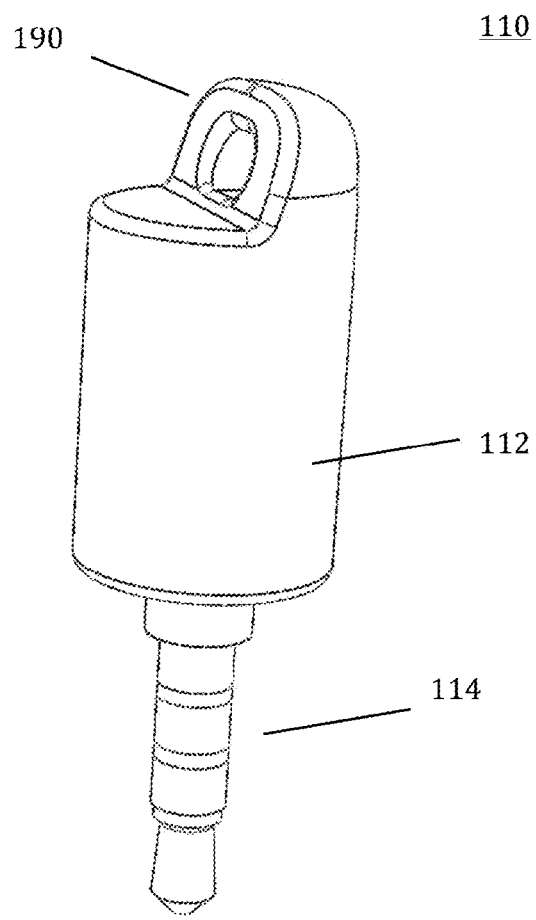
FIG. 13 is a view of the token of the present invention.
Figure 14:
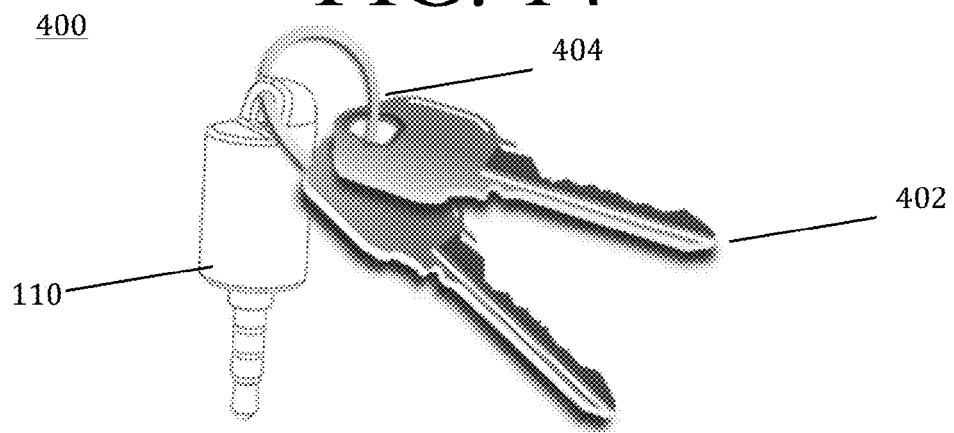
FIG. 14 is a view of the portable token system of the present invention.

Turning now to FIGS. 13-14, the token 110 includes a body 112 and a plug 114. The body may be constructed of a resilient plastic, epoxy, or other non-conductive material (or a combination of materials) that is impervious to a broad range of solvents to prevent access to the internal components of the token. The preferred body is a cylinder, a truncated cylinder, or some similar form that is capable of protecting the electronics contained within. The encompassing body diameter should be significant to the degree that the body is not flexible (or otherwise fragile) while still fully containing the enclosed electronics. An affixation member 190 (e.g., retention bar) is integrated to the body 112 to permit the token to be joined to an affixation member holder (e.g. a key ring) or other handy portable entity, e.g. purses, lanyards, identification clasps, etc. The form of the affixation member 190 may be highly variable, and depends upon the target portable entity 404. Because the ideal portable system 400 includes pairing the token 110 with a key ring 404 with keys 402, the body is sized to suitably interact with the keys. The encompassing diameter of the body permits the token to be readily distinguishable from other key ring items.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:
1. A cryptographic system comprising:
A computing device ("host") with a jack supporting bidirectional audio communications over multiple channels, a host arithmetic logic unit ("ALU"), and a host nontransitory computer-readable storage medium ("host memory") in signaled communication with said host ALU bearing machine-readable instructions ("host instructions") for:
modulating and transmitting an analog power waveform, over a first audio channel ("power channel") of said multiple channels, comprising an analog waveform structured for use as a power source;
generating an analog waveform ("request waveform") by modulating digital information ("request") comprising of a cryptographic challenge;
transmitting said request waveform over a second audio channel ("request channel") of said multiple channels;
receiving an analog waveform ("response waveform") comprising an analog waveform over a third audio channel ("response channel") of said multiple channels;
demodulating digital information ("response") from said response waveform; and
establishing a data communications protocol over said request channel and said response channel;
a physical token having a plug, dimensioned to releasably affix within said jack, and a token body comprising a token ALU and a token nontransitory computer-readable storage medium ("token memory") in signaled communication with said token ALU bearing machine-readable instructions ("token instructions") for:
receiving said request waveform over said request channel;
demodulating said request from said request waveform;
performing a cryptographic operation with said token ALU utilizing said request and data derived from said token memory to generate said response;
modulating said response into said response waveform;
transmitting said response waveform over said response channel; and
establishing said data communications protocol with the host;
a token energy harvester within said token body, configured for generating operating power for said token ALU from said analog power waveform received over said power channel.

2. The system of claim 1 wherein said token memory includes a token identity and said response is derived from said token identity.

3. The system of claim 2 wherein said token memory further comprises a secure element bearing said token identity, in signaled communication with said token ALU.

4. The system of claim 1 wherein said host memory includes host software for: detecting the affixture of said jack; and conditioning transmission of said power waveform upon affixture of said jack.

5. The system of claim 1 wherein said host device verifies a user; and said verification response unlocks a corresponding token identity.

6. The system of claim 2 further comprising a WAN resource, and wherein said host includes a WAN transceiver and WAN resource locator program; whereby said WAN resource requires said response to perform an operation related to an identity.

7. The system of claim 6 wherein said WAN resource is adapted to transmit a security challenge to said WAN resource locator program via said WAN transceiver, whereby said request includes a security challenge adapted to generate said response based on said identity.

8. The system of claim 1 wherein at least one of said token instructions and said host instructions includes operating said token ALU at a variable clock speed.

9. The system of claim 8 wherein at least one of said host instructions and said token instructions includes ascertaining a preferred clock speed based on monitoring said token ALU performance while operating said token ALU at said variable clock speed.

10. The system of claim 8 wherein at least one of said host instructions and said token instructions includes varying said clock speed based on a particular function being performed by said token ALU.

11. The system of claim 1 wherein said request channel and said response channel operate at distinct, variable data communication rates.

12. The system of claim 11 wherein at least one of said token instructions and said host instructions includes varying said data communication rates; and ascertaining preferred communication rates.

13. The system of claim 1 wherein said token body includes a radially symmetrical body.

14. The system of claim 13 wherein said token further includes an affixation member, integrated to said token body, dimensioned to form a void for attachment to a foreign entity.

15. The system of claim 14 comprising said host and a token affixation member holding mechanism bearing said token.

16. An authentication method between a computing device host with a jack supporting bidirectional audio communications over multiple channels, and a physical token having a plug affixed within said jack, said method comprising:
    modulating and transmitting, from said host to said token, an analog power waveform over a first audio channel ("power channel") of said multiple channels to be used as a power source by said token;
    harvesting operating power from received said analog power waveform for a token arithmetic logic unit ("ALU") within said token;
    generating an analog waveform ("request waveform") by modulating digital information ("request") comprising of a cryptographic challenge;
    transmitting said request waveform, from said host to said token, over a second audio channel ("request channel") of said multiple channels;
    receiving said request waveform at said token, and demodulating with said token ALU said request from said request waveform;
    performing a cryptographic operation with said token ALU that includes said request and data derived from a token nontransitory computer-readable storage medium ("token memory") of said token, and in signaled communication with said token ALU to generate digital information as a response;
    modulating with said token ALU said response into an analog waveform ("response waveform");
    transmitting said response waveform, from said token to said host, over a third audio channel ("response channel") of said multiple channels;
    receiving by said host said response waveform from said token;
    demodulating with said host ALU said response from said response waveform; and
    establishing a data communications protocol between said host and said token over said request channel and said response channel.

17. The method of claim 16 wherein said performing step includes performing said operation with said token ALU wherein said token memory includes a token identity and said response is derived from said identity.

18. The method of claim 17 wherein said performing step includes performing said operation with said token ALU wherein said token identity is stored in a secure element in signaled communication with said token ALU.

19. The method of claim 17 further comprising the step of transmitting said response from said host, using a WAN resource locater program in a host nontransitory computer-readable storage medium ("host memory") accessing a WAN, to a WAN resource to perform an operation related to an identity.

20. The method of claim 19 further comprising the step of receiving a security challenge from said WAN resource with said WAN resource locator program; and wherein said request includes said security challenge.

21. The method of claim 16 further comprising the step of varying the clock speed of said token ALU to ascertain preferred clock speeds.

22. The method of claim 16 further comprising the step of varying the data communication rate ("bit rate") for said response channel to ascertain preferred bit rates.

23. The method of claim 16 further comprising the step of varying the data communications rate ("bit rate") for said request channel to ascertain preferred bit rates.

24. A cryptographic system comprising:
    A computing device host with a jack supporting bidirectional audio communications over multiple channels, a host arithmetic logic unit ("ALU"), and a host nontransitory computer-readable storage medium ("host memory") in signaled communication with said host ALU bearing machine-readable instructions ("host instructions") for:
        modulating and transmitting an analog power waveform, over a first audio channel ("power channel") of said multiple channels, comprising an analog waveform structured for use as a power source;
        generating an analog waveform ("request waveform") by modulating digital information ("request") comprising of a cryptographic challenge;
        transmitting said request waveform over a second audio channel ("request channel") of said multiple channels;
        receiving an analog waveform ("response waveform") comprising an analog waveform over a third audio channel ("response channel") of said multiple channels;
        demodulating digital information ("response") from said response waveform; and
        establishing a data communications protocol over said request channel and said response channel;
    a physical token having a data exchange path consisting of a plug, dimensioned to releasably affix within said jack to initiate a token session terminated upon removal of said jack from said plug, and a token body comprising a token ALU and a token nontransitory computer-readable storage medium ("token memory") in signaled communication with said token ALU bearing machine-readable instructions ("token instructions") for:
  receiving said request waveform over said request channel;
  demodulating said request from said request waveform;
  performing a cryptographic operation with said token ALU utilizing said request and data derived from said token memory to generate said response;
  modulating said response into said response waveform;
  transmitting said response waveform over said response channel; and
  establishing said data communications protocol with the host;
a token energy harvester within said token body, configured for generating operating power for said token ALU from said analog power waveform.

* * * * *